R. W. JORDAN.
TIRE FASTENER.
APPLICATION FILED MAY 15, 1907.

963,048.

Patented July 5, 1910.
2 SHEETS—SHEET 1.

Witnesses
C. E. Smith.
M. A. Schmidt

Inventor
Rurie W. Jordan
By Milo B. Stevens & Co.
Attorneys

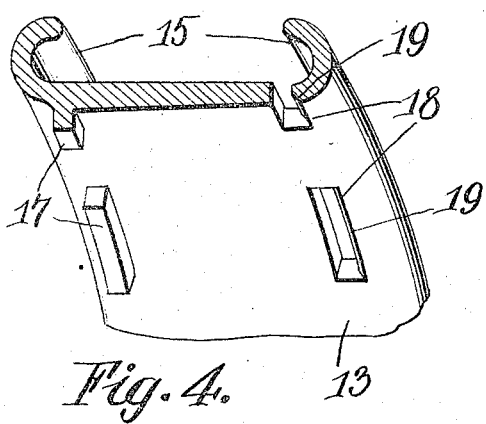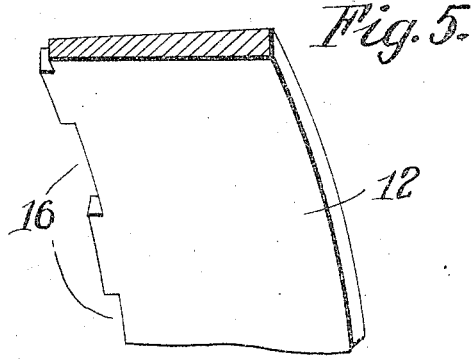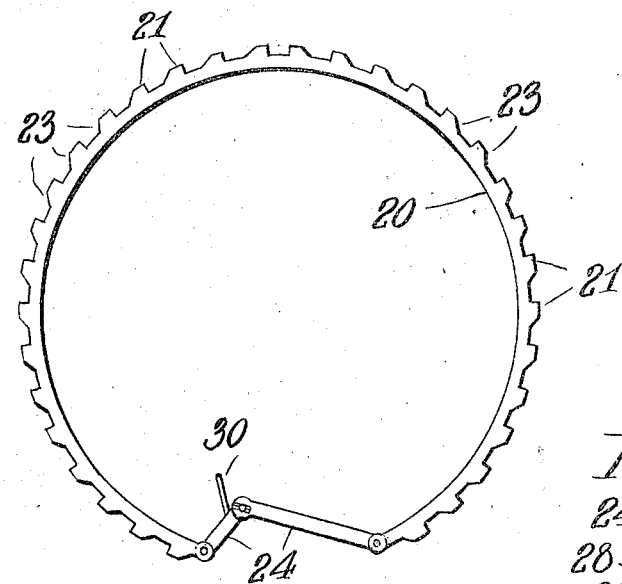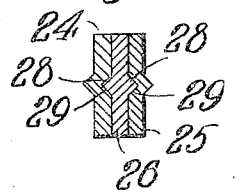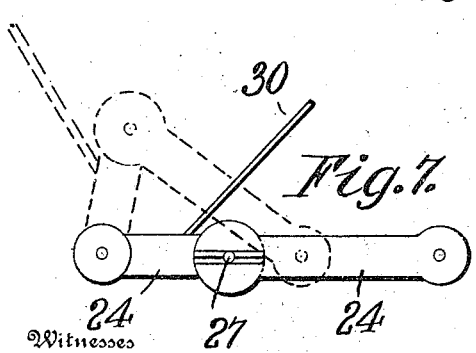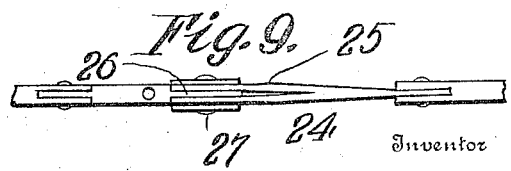

UNITED STATES PATENT OFFICE.

RURIC W. JORDAN, OF BOSTON, MASSACHUSETTS, ASSIGNOR TO JORDAN DEMOUNTABLE RIM COMPANY, OF BOSTON, MASSACHUSETTS, A CORPORATION OF MASSACHUSETTS.

TIRE-FASTENER.

963,048.  Specification of Letters Patent.  Patented July 5, 1910.

Application filed May 15, 1907. Serial No. 373,837.

*To all whom it may concern:*

Be it known that I, RURIC W. JORDAN, a citizen of the United States, residing at Boston, in the county of Suffolk and State of Massachusetts, have invented certain new and useful Improvements in Tire-Fasteners, of which the following is a specification.

This invention relates to pneumatic tires, and more particularly to the fastening means therefor, the object of the invention being to provide a fastener which permits the tire to be readily put on or taken off the wheel.

The invention comprises a rim which is in two sections to one of which the tire is fastened and which is detachably connected to the other section, the latter being permanently fastened to the felly of the wheel.

The invention also comprises novel means for securely fastening the rim-sections together and which permits their ready separation when desired.

Figure 1:
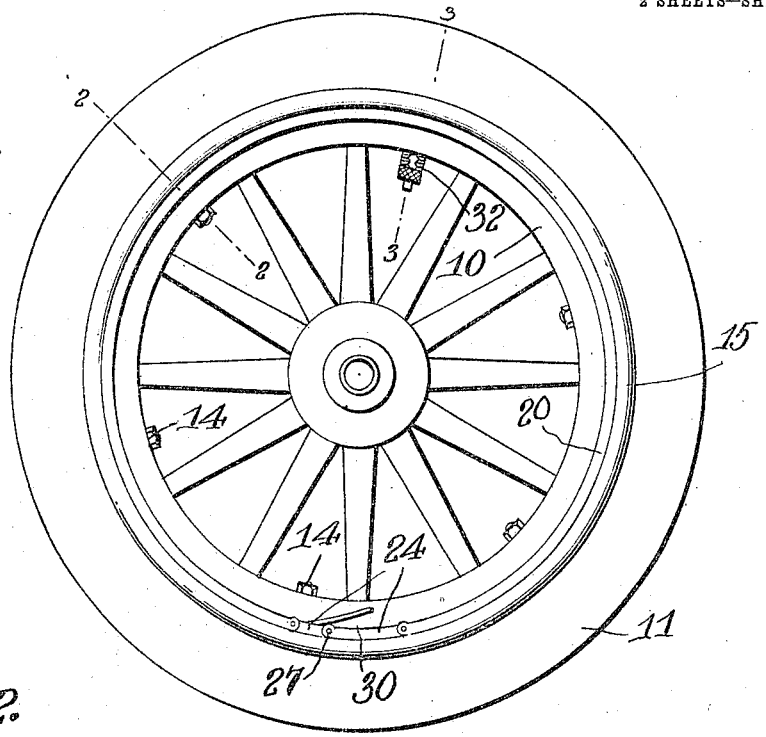
Figures 2, 3:
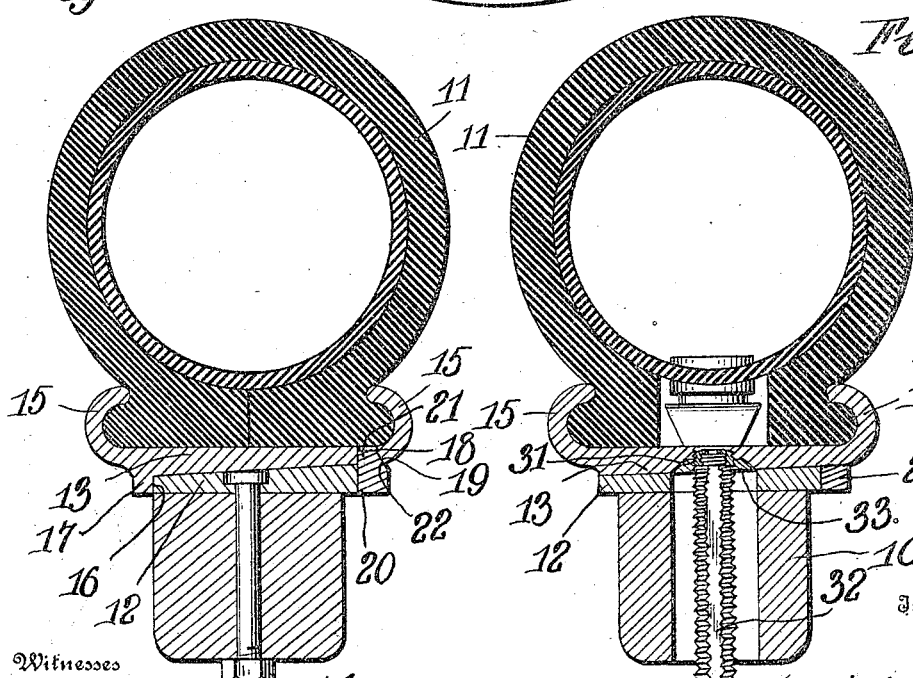

In the accompanying drawings, Figure 1 is an elevation of a wheel showing the application of the invention. Fig. 2 is a cross-section on the line 2—2 of Fig. 1. Fig. 3 is a cross-section on the line 3—3 of Fig. 1. Fig. 4 is a perspective view of a portion of one of the rim-sections. Fig. 5 is a perspective view of a portion of the other rim-section. Fig. 6 is an elevation of the clamping-ring hereinafter referred to. Fig. 7 is a detail of the connecting links of the clamping member hereinafter referred to. Fig. 8 is a vertical section, and Fig. 9 is an edge view thereof.

Referring specifically to the drawings, 10 denotes the usual wooden felly of the wheel. The rim which fastens the tire 11 to the felly is in two sections indicated at 12 and 13, respectively. The section 12 is permanently secured to the felly by means of bolts 14, or in any other suitable manner. The section 13 carries the tire and is detachably connected to the section 12. At the edges of the section 13 are the usual tire-gripping flanges 15. The contiguous faces of the two sections are made slanting as clearly shown in Figs. 2 and 3 for a purpose to be hereinafter described. In one edge of the section 12 are notches 16 which are entered by projections 17 on the section 13 adjacent one of its edges whereby the latter is prevented from "creeping" on the section 12. Adjacent its opposite edge the section 13 has a series of slots 18, having beveled walls on one side as indicated at 19. The other side walls are in line with the edge of the section 12.

The clamping member for fastening the two sections together comprises a flexible ring 20 having on its periphery a series of teeth 21 which are beveled on one side as indicated at 22 to correspond to the bevel 19 of slots 18. The teeth are also made inclined or slanting at one end as indicated at 23. The ring is discontinuous being connected at its ends by a pair of links 24 by means of which the ring can be expanded and contracted.

In use, the ring 20 is placed on the edge of the section 12 with its teeth 21 extending into the slots 18. By reason of the slant of the contiguous faces of the sections 12 and 13 a pressure fit is had therebetween when the ring is in place, the bevels 19 and 22 serving to draw them tightly together, and at the same time the slant makes the removal of the section 13 easy upon disengagement of the ring. By the inclines 23 the teeth 21 will force themselves out of the slots 18 when the ring is contracted. It will be noted that the inclines of one-half of the ring are oppositely presented to the inclines of the other half of the ring. The links 24 form a toggle and when straightened out they expand the ring to bring the teeth 21 into the slots 18, which locks the section 13 to the section 12. When the links are swung away from each other the ring contracts which withdraws the teeth from the slots which releases the section 13 and permits it to be removed.

The construction of the links 24 is clearly illustrated in Figs. 7 to 9. One of the links is forked as indicated at 25 and receives between its branches the reduced end 26 of the other link. The links are connected by a pivot joint 27. On opposite sides of the reduced end 26 are longitudinal ribs 28, and on the inner sides of the branches 25 are longitudinal grooves 29. The parts are so arranged that when the links are expanded to expand the ring 20, the ribs enter the grooves, whereby the links are securely held in expanded position. The forked link is made of spring metal so that when the links are contracted to contract the ring, the branches 25 spread to permit the ribs and grooves to separate. When the links are in expanded position as shown in Fig. 7, the pivot 27 will be so located with respect to a straight line between the points at which the links are connected to the ends of the ring 20, that any pressure on the links will be in a direction opposite to that tending to contract the links, by reason of which the ring will not get loose accidentally. When in expanded position the links rest on the rim-section 12 thus relieving the ribs from all strain. One of the links is fitted with a removable operating lever 30.

The tire-fastener herein described is especially advantageous for automobiles while touring or racing. The motorist can carry one of the rim-sections 13 attached to an extra tire all inflated, so that in case of damage to one of the tires, the damaged tire can be readily removed with its rim-section 13 replaced by the extra tire and its rim-section. Very little time will be lost as the change can be quickly made, the extra tire being already inflated.

The stem of the valve for inflating the tire is in two sections indicated at 31 and 32, respectively, the former being carried by the tire and the rim-section 13 and the latter being carried by the felly 10 and the rim-section 12. The object of making the valve-stem in two sections arranged as stated is to permit the removal of the tire and rim-section 13 as heretofore described. The inner end of the valve-stem section 32 is reduced and threaded to screw into the threaded bore of the section 31. The outside of the valve-stem sections is threaded to receive a nut 33 which screws down over the joint between the sections. The nut is round and beveled on one side and seats in a recess in the rim-section 13 as shown in Fig. 3 so as to be flush with the inner surface of said rim-section.

The valve construction herein described enables the tire to be inflated when on the wheel and also when it is off the wheel. When the tire and rim-section 13 are removed the valve-stem sections must be separated which is readily done by unscrewing the section 32 from the section 31. When the tire and rim section are put on the wheel the valve-stem section will be connected by screwing them together. The tire can then be inflated if necessary without removing it from the wheel.

I claim:—

1. The combination with a wheel, of a rim comprising inner and outer sections, the inner section being secured to the felly, and the outer section having slots along one of its edges, and an expansible ring on the outside of the inner section, and having teeth entering the aforesaid slots.

2. The combination with a wheel, of a fixed and a removable rim-section on the felly, the removable rim-section having slots along one of its edges, and an expansible ring on the outside of the inner section and having wedge-shaped teeth entering said slots.

3. The combination with a wheel, of a fixed and a removable rim-section on the felly, the removable rim-section having slots along one of its edges, an expansible ring fitting on one of the edges of the fixed rim-section and having teeth entering the aforesaid slots, and projections at the opposite edge of the removable rim-section engaging the adjacent edge of the fixed section.

4. The combination in a wheel, of a felly, a fixed rim, a removable rim, one of said rims having slots and one of said rims having means at one side to prevent lateral displacement of the removable rim, a split expansible locking ring at the opposite side, carrying means working in said slots to lock said removable rim in operative position.

5. The combination with a wheel; of a rim comprising inner and outer sections, having complemental, inclined, abutting faces, said inner section being secured to the felly, and the outer section having slots adjacent to one of its edges; and an expansible ring having a bearing upon or against the inner section and having teeth entering the aforesaid slots.

6. A detachable rim for wheels comprising a member adapted to be rigidly secured to a felly, the outer face of said member being inclined from one edge to the other, the thinner edge thereof being notched; a second or tire-carrying member having a complemental inclined face adapted to contact with the inclined face of the first member, said second member having a series of lugs projecting therefrom and adapted, when the parts are positioned, to engage the notches aforesaid, said member being likewise provided adjacent to its opposite edge with a series of openings or slots; and an expansible locking member provided with teeth adapted to enter the slots aforesaid, the body of said locking member bearing against the adjacent side edge or face of the fixed or first member whereby the tire-carrying member will be held firmly to its seat against sidewise and rotative movements.

7. The combination with a wheel; of a rim comprising inner and outer sections, the inner section being secured to the felly, said sections having complemental, inclined, contacting faces; means for holding said sections against relative rotative movement; an expansible ring bearing against the broad edge of the inner rim section, said ring having wedge-shaped teeth adapted to pass into wedge-shaped slots formed in the outer rim section; and means for holding the ring in expanded position.

8. The combination with a wheel; of a rim comprising inner and outer sections, the inner section being secured to the felly and the outer section having slots along one of its edges; and an expansible ring adapted to bear against one edge of the inner section, said ring being provided with teeth adapted to enter the slots aforesaid, each tooth being provided with an inclined face, the inclination of the faces throughout one half of the ring being the reverse of that upon the other.

9. The combination with a wheel; of a rim comprising inner and outer sections, the inner section being secured to the felly and the outer section having slots adjacent to one of its edges, the outermost wall of each slot being inclined; and an expansible locking member comprising an open ring-shaped member having teeth upon its periphery adapted to enter the slots, the outer face of each tooth being inclined the reverse of that of the inclined face of the slot which it enters, one side or edge of each tooth being likewise beveled or inclined, the inclination of such edges throughout one half of the ring being the reverse of that upon the other.

10. The combination with a wheel; of a rim comprising inner and outer sections, the inner section being secured to the felly, and the outer section having slots adjacent to one of its edges; and an expansible locking member, comprising an open ring-shaped member having teeth upon its periphery adapted to enter the slots aforesaid; and a toggle mechanism connecting the ends of the ring-shaped member and serving when straightened to expand said member and to force the teeth into the slots.

11. The combination with a wheel; of a rim comprising inner and outer sections, the inner section being secured to the felly and the outer member having slots adjacent to one of its edges; a ring-shaped member having teeth upon its periphery adapted, when said member is expanded, to enter the slots; and toggle mechanism interposed between the ends of said ring-shaped member, said toggle being provided with a locking device adapted to hold it in its straightened position.

12. The combination with a wheel; of a rim comprising an inner section secured to the felly, and an outer tire-carrying section adapted to be seated upon the inner section; means carried by said sections for holding the same against relative rotative movement when said sections are assembled; and a locking device for said sections comprising an expansible ring having teeth, the body of the ring, when positioned, bearing against the edge of one section and the teeth entering openings in the other section.

In testimony whereof I affix my signature, in presence of two witnesses.

RURIC W. JORDAN.

Witnesses:
Thomas Mannix,
Eugene H. De Normandie.